Patented June 23, 1931                                                              1,811,711

UNITED STATES PATENT OFFICE

JOHN WILLIAM BLAGDEN, OF LONDON, ENGLAND, ASSIGNOR OF ONE-HALF TO HOWARDS & SONS LIMITED, OF ILFORD, ESSEX, ENGLAND

PROCESS FOR MAKING SYNTHETIC MENTHOL

No Drawing.   Application filed June 19, 1924, Serial No. 721,137, and in Great Britain May 21, 1924.

This invention relates to a process for the manufacture of crystalline menthol from cyclic ketones which are capable of yielding menthol on catalytic hydrogenation, such as menthone.

I have found that such cyclic ketones such as menthone also yield, on hydrogenation, a mixture which consists substantially of a substance which is a crystalline solid at ordinary temperature and a substance which has a much lower melting point and is normally a liquid. The solid body is an optically inactive menthol and the liquid is apparently an isomer thereof.

When these compounds are treated with hydrogen in presence of a catalyst a condition is soon attained when the compound ceases to absorb hydrogen. The product is then, as above stated, a mixture which on cooling may deposit some of the crystalline solid, the rest remaining liquid at ordinary temperature. In the product therefore these two forms have a certain proportion to each other when absorption of hydrogen ceases, the solid product being of course in the molten condition.

I have discovered that this proportion can be changed by agitating the mixture in an atmosphere of hydrogen or containing hydrogen and in presence of a catalyst, and a new proportion set up, with the result that a much larger proportion of crystals can be obtained on cooling than if the product of hydrogenation had been cooled directly.

By taking advantage of this discovery I am able to obtain from the parent compound, such as menthone, the crystalline body in enhanced yield, and in one procedure as practically the only product.

The object can be attained by agitating the normally liquid product in the presence of the still molten solid product in an atmosphere of hydrogen or containing hydrogen and in presence of a catalyst. Thus, if when the parent compound ceases to absorb hydrogen, the mixture is brought to a temperature of about 110°–120° C. and is then agitated in an atmosphere containing hydrogen in presence of a catalyst and subsequently cooled, a larger proportion of crystalline solid separates than would have been the case had the cooling occurred when the first treatment with hydrogen was at an end.

Another procedure consists in separating the crystals from the liquid after the mixture produced at the end of the hydrogenation has cooled and then mixing this liquid with the parent compound and hydrogenating this mixture in the known manner. The parent compound in the mixture is hydrogenated and the agitation of the normally liquid body in presence of the hydrogen and catalyst produces a quantity of the crystalline form. It follows that when the mixture is again cooled the proportion of crystals produced to the parent compound used is greater than it would have been had the parent compound alone been hydrogenated.

This latter procedure leads to a process by which the parent compound is hydrogenated in successive batches, the normally liquid product from the first batch being mixed with the second batch of parent compound before this is hydrogenated and the normally liquid product from this batch being mixed with the third batch of parent compound before it is hydrogenated, and so on, so that ultimately there remains only so much of the normally liquid product as was present after hydrogenating the first batch.

I have further found that if the liquid constituent be agitated alone at a raised temperature, preferably about 110°–120° C., in an atmosphere of hydrogen or containing hydrogen and in presence of a catalyst, a portion of it becomes converted into the crystalline solid product. Thus, it may be advantageous to heat the normally liquid portion of the product from any of the batches referred to above and to agitate it in an atmosphere of hydrogen or containing hydrogen and in presence of a catalyst, and subsequently to cool the product of this agitation to separate the portion of crystals before the normally liquid product is mixed with the parent compound for the further hydrogenation.

The invention is illustrated by the following examples:—

*Example 1.*—150 lbs. of the parent compound, for example, menthone are melted and mixed with 2 lbs. of nickel catalyst made by reducing a nickel compound in known manner. The mixture is stirred in known manner in an autoclave with hydrogen, at 30-70 lbs. per sq. inch pressure and at an average temperature of 130°-160° C., until the absorption of hydrogen ceases. The hot liquid is separated from the catalyst and cooled slowly to about 10° C. The crystals which separate (amounting to about 30 per cent. of the parent compound treated) are removed from the liquid and the latter is mixed with a weight of parent compound equal to that of the crystals removed; this mixture is hydrogenated and treated in the manner described above (with production of crystals amounting to about 100 per cent. of the parent compound in the mixture hydrogenated). The liquid portion ultimately obtained being mixed with another portion of parent compound and so on.

*Example 2.*—After the first, or indeed after any of the hydrogenations described in Example 1, the mixture in the autoclave is cooled or allowed to cool to between 110° C. and 120° C., and thoroughly stirred at this temperature for several hours without further passage of hydrogen; cooling, separation of the crystals and mixing the liquid with more parent compound for another hydrogenation then follows as described in Example 1. The proportion of crystals thus obtained is considerably greater than in Example 1.

*Example 3.*—100 lbs. of the normally liquid product from the hydrogenation of the parent compound are mixed with a nickel catalyst and the mixture is heated to 120° C. in an atmosphere of hydrogen. While the temperature is maintained the mixture is stirred vigorously for several hours. On cooling to 10° C. crystals amounting to some 50 per cent. of the weight of the original liquid are produced.

Having thus described the nature of the said invention and the best means I know for carrying the same into practical effect, I claim:—

1. In a process of making crystalline menthol by catalytic hydrogenation of cyclic ketones which yield on hydrogenation a mixture of crystalline menthol and a normally liquid product, the step which consists in adding to the ketone to be hydrogenated a quantity of the normally liquid constituent of the hydrogenated ketone.

2. In a process of making crystalline menthol by catalytic hydrogenation of cyclic ketones which yield on hydrogenation a mixture of crystalline menthol and a normally liquid product, the steps which consist in cooling the product of hydrogenation to about 10° C., separating the crystals from the liquid, mixing the latter with a weight of ketone equal to that of the crystals removed and catalytically hydrogenating the mixture.

3. In a process of making crystalline menthol by catalytic hydrogenation of cyclic ketones which yield on hydrogenation a mixture of crystalline menthol and a normally liquid product, hydrogenating a portion of the ketone cooling the product of hydrogenation, separating the crystals from the liquid, adding the liquid to a second portion of the ketone, hydrogenating the mixture, cooling the product, separating the crystals from the liquid, adding the liquid to a third portion of the ketone and repeating these operations with successive portions of the ketone.

4. In a process of making crystalline menthol by catalytic hydrogenation of menthone, the step which consists in adding to the menthone to be hydrogenated a quantity of the normally liquid constituent of hydrogenated menthone.

5. In a process of making crystalline menthol by catalytic hydrogenation of menthone, the steps which consist in cooling the product of hydrogenation to about 10° C., separating the crystals from the liquid, mixing the latter with a weight of menthone equal to that of the crystals removed and catalytically hydrogenating the mixture.

6. In a process of making crystalline menthol by catalytic hydrogenation of menthone, hydrogenating a portion of the menthone, cooling the product of hydrogenation, separating the crystals from the liquid, adding the liquid to a second portion of the menthone, hydrogenating the mixture, cooling the product, separating the crystals from the liquid, adding the liquid to a third portion of the menthone and repeating these operations with successive portions of the menthone.

7. In a process of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating the normally liquid constituent of the product of the hydrogenation in presence of hydrogen and a nickel catalyst at a temperature below the normal boiling point of said constituent and not lower than 110° C.

8. In a process of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating, at a temperature between 110° and 120° C. and in presence of hydrogen and a nickel catalyst, the normally liquid constituent of the product of the hydrogenation.

9. In a process of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating the product of the hydrogenation at a temperature between 110° and 120° C. in presence of hydrogen and a nickel catalyst.

10. In a process of making crystalline menthol by catalytic hydrogenation of menthone, the combination of steps which consists in catalytically hydrogenating menthone and thereafter agitating the normally liquid constituent of the product of hydrogenation in presence of hydrogen and a nickel catalyst at a temperature below the normal boiling point of said constituent and not lower than 110° C.

11. In a process of making crystalline menthol by catalytic hydrogenation of menthone, the combination of steps which consists in catalytically hydrogenating the menthone and thereafter agitating, at a temperature between 110° and 120° C. and in presence of hydrogen and a nickel catalyst, the normally liquid constituent of the product of the hydrogenation.

12. In a process of making crystalline menthol by catalytic hydrogenation of menthone, the combination of steps which consists in catalytically hydrogenating the menthone and thereafter agitating the product of the hydrogenation at a temperature between 110° and 120° C. and in presence of a nickel catalyst.

13. In a progress of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating the product of the hydrogenation at a temperature below the normal boiling point of said product and not lower than 110° C. in presence of hydrogen and a nickel catalyst.

14. In a process of making crystalline menthol by catalytic hydrogenation of menthone, the combination of steps which consists in catalytically hydrogenating the menthone and thereafter agitating the product of the hydrogenation at a temperature below the normal boiling point of said product and not lower than 110° C. in presence of hydrogen and a nickel catalyst.

15. In a process of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating the normally liquid constituent of the product of the hydrogenation in presence of hydrogen and a hydrogenating catalyst at a temperature below the normal boiling point of said constituent and not lower than 110° C.

16. In a process of making crystalline menthol by catalytic hydrogenation of menthone, the combination of steps which consists in catalytically hydrogenating menthone and thereafter agitating the normally liquid constituent of the product of hydrogenation in presence of hydrogen and a hydrogenating catalyst at a temperature below the normal boiling point of said constituent and not lower than 110° C.

17. In a process of making crystalline menthol by catalytic hydrogenation of cyclic ketones which yield on hydrogenation a mixture of crystalline menthol and a normally liquid product, the combination of steps which consists in catalytically hydrogenating the ketone and thereafter agitating the product of the hydrogenation at a temperature below the normal boiling point of said product and not lower than 110° C. in presence of hydrogen and a hydrogenating catalyst.

18. In a process of making crystalline menthol by catalytic hydrogenating of menthone, the combination of steps which consists in catalytically hydrogenating the menthone and thereafter agitating the product of the hydrogenation at a temperature below the normal boiling point of said product and not lower than 110° C. in presence of hydrogen and a hydrogenating catalyst.

In testimony whereof I have signed my name to this specification.

JOHN WILLIAM BLAGDEN.